United States Patent
Peloux et al.

(10) Patent No.: US 10,466,107 B2
(45) Date of Patent: Nov. 5, 2019

(54) METHOD FOR DETERMINING AN OPTICAL PERFORMANCE OF A HEAD MOUNTED DISPLAY DEVICE

(71) Applicant: Essilor International, Charenton-le-Pont (FR)

(72) Inventors: Marius Peloux, Charenton-le-Pont (FR); Loic Baillon, Charenton-le-Pont (FR); Ludovic Jouard, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 27 days.

(21) Appl. No.: 15/797,818

(22) Filed: Oct. 30, 2017

(65) Prior Publication Data

US 2018/0128685 A1 May 10, 2018

(30) Foreign Application Priority Data

Nov. 4, 2016 (EP) .................................. 16306447

(51) Int. Cl.
*G06T 7/90* (2017.01)
*G01J 3/50* (2006.01)
(Continued)

(52) U.S. Cl.
CPC ......... *G01J 3/506* (2013.01); *G01M 11/0257* (2013.01); *G02B 3/12* (2013.01);
(Continued)

(58) Field of Classification Search
CPC ....... G01J 3/506; G06T 7/90; G01M 11/0257; G02B 3/12; G02B 27/017; G02B 27/0172; G02B 27/0176; G02B 27/62
(Continued)

(56) References Cited

U.S. PATENT DOCUMENTS 5,731,902 A 3/1998 Williams et al.
2010/0289880 A1 11/2010 Moliton

FOREIGN PATENT DOCUMENTS

JP 2006-203440 8/2006
WO WO 2007/048929 A1 5/2007
WO WO 2007/125257 A1 11/2007

OTHER PUBLICATIONS

JP2006-203440 Machine Translation (Year: 2006).*
(Continued)

*Primary Examiner* — Nguyen T Truong
(74) *Attorney, Agent, or Firm* — Oblon, McClelland, Maier & Neustadt, L.L.P.

(57) ABSTRACT

A method for determining an optical performance parameter of a head mounted display device adapted for a wearer includes a head mounted display device providing step, during which a head mounted display device adapted for a wearer is provided, an optical measurement device providing step, during which an optical measurement device is provided that includes an entrance pupil and a sensor receiving light through the entrance pupil, a positioning step, during which the optical measurement device and the head mounted display device are positioned so that the position of the entrance pupil of the optical measurement device corresponds to the position of the pupil of the wearer when wearing the head mounted display device, an optical performance parameter determining step during which at least one optical performance parameter of the head mounted see-through display device is determined based on the data measured by the optical measurement device.

18 Claims, 3 Drawing Sheets

(51) Int. Cl.
G02B 3/12 (2006.01)
G02B 27/01 (2006.01)
G01M 11/02 (2006.01)
G02B 27/62 (2006.01)

(52) U.S. Cl.
CPC ....... *G02B 27/017* (2013.01); *G02B 27/0172* (2013.01); *G02B 27/0176* (2013.01); *G02B 27/62* (2013.01); *G06T 7/90* (2017.01); *G02B 2027/011* (2013.01); *G02B 2027/0112* (2013.01); *G02B 2027/0159* (2013.01); *G02B 2027/0178* (2013.01)

(58) Field of Classification Search
USPC .......................................................... 348/53
See application file for complete search history.

(56) References Cited

OTHER PUBLICATIONS

European Search Report dated Sep. 7, 2017 in European Application 16306447.0, filed on Nov. 4, 2016 (with Written Opinion).
Joseph L. Gabbard, et al. "Color Blending in Outdoor Optical See-through AR: The Effect of Real-world Backgrounds on User Interface Color", IEEE Virtual Reality (VR), XP032479475, 2013, 2 pages.

* cited by examiner

METHOD FOR DETERMINING AN OPTICAL PERFORMANCE OF A HEAD MOUNTED DISPLAY DEVICE

FIELD OF THE INVENTION

The invention relates to a method for determining an optical performance parameter of a head mounted display device adapted for a wearer and a method of assembling a head mounted display device adapted for a wearer.

The invention further relates to imaging photo-colorimeter having a pupil shift element.

BACKGROUND OF THE INVENTION

Head mounted display devices are becoming more and more popular. Such type of device usually comprise a display element adapted to display images to the wearer of the head mounted device.

There is a need to provide a method for determining the optical performances of such display devices.

Imagining photo-colorimeters also called videocolorimeters are frequently used to determine the color response of display devices such as computer or television screens.

However, unlike most display devices, such as computer or television screens, head mounted display devices are very position sensitive. In particular the optical performances of head mounted devices are very sensitive to the position relative to the eye of the wearer. Furthermore, the configuration of most of the head mounted display devices makes the positioning of the measuring device such as imagining photo-calorimeters complex.

Therefore, there is need for a method for determining optical parameters of a head mounted display device.

One object of the present invention is to provide such a method.

SUMMARY OF THE INVENTION

To this end, the invention proposes a method for determining an optical performance parameter of a head mounted display device adapted for a wearer, the method comprising at least:
- a head mounted display device providing step, during which a head mounted display device adapted for a wearer is provided,
- an optical measurement device providing step, during which an optical measurement device is provided, the optical measurement device comprises at least an entrance pupil and a sensor receiving light through the entrance pupil,
- a positioning step, during which the optical measurement device and the head mounted display device are positioned so that the position of the entrance pupil of the optical measurement device corresponds to the position of the pupil of the wearer when wearing the head mounted display device,
- an optical performance parameter determining step during which at least one optical performance parameter of the head mounted see-through display device is determined based on the data measured by the optical measurement device.

Advantageously, the method of the invention allows increasing the quality of the measurements of the optical performance parameters of the head mounted device.

Indeed, the inventors have observed that positioning the optical measurement device and the head mounted display device so that the position of the entrance pupil of the optical measurement device corresponds to the position of the pupil of the wearer when wearing the head mounted display device significantly increases the accuracy of the measurements obtained by the measuring device.

According to further embodiments which can be considered alone or in combination:
- the method further comprises prior to the positioning step, a pupil moving element providing step during which a pupil moving element configured to move the entrance pupil of the optical measurement device is provided and during the positioning step the pupil shift element is configured so as to shift the entrance pupil of the optical measurement device to the position of the pupil of the wearer when wearing the head mounted display device; and/or
- the pupil moving element is a pupil shift element configured to shift the entrance pupil of the optical measurement device; and/or
- the entrance pupil of the measuring device and/or of the pupil shift element has/have a diameter greater than or equal to 2 mm and smaller than or equal to 10 mm; and/or
- the pupil shift element comprises an objective configured to have a focus range between 25 cm and infinity; and/or
- the objective comprises an objective entrance pupil, an objective exit pupil, a first positive lens having a first focal distance and a second positive lens having a second focal distance, the objective entrance pupil, the first and second positive lenses and the exit pupil being placed along a common optical axis, with a distance between the entrance pupil and the first positive lens equal to the focal distance of the first positive lens, a distance between the first positive lens and the second positive lens equal to the addition of the focal distances of the first and second optical lenses, and the distance between the exit pupil and the second positive lens equal to the focal distance of the second positive lens; and/or
- the optical magnification of the objective is equal to −1; and/or
- the optical measurement device is an imaging photo-colorimeter; and/or
- the head mounted display device is mounted in a spectacle frame; and/or
- the head mounted display device is a see-through head mounted display device; and/or
- the head mounted display device is configured so that the display images are seen by the wearer through an optical lens having a dioptric function and the method further comprises prior to the positioning step a compensation optical element providing step during which an optical element having a dioptric function adapted to compensate the dioptric function of the optical lens having a dioptric function is provided between the optical lens having a dioptric function and the entrance pupil of the entrance pupil of the optical measurement device; and/or
- the head mounted display device is configured so that the display images are seen by the wearer through an optical lens having a dioptric function, and the method further comprises prior to the positioning step an immersion step during which the optical element having a dioptric function is immerged in a medium having a refractive index deferring by less than 0.05, for example less than 0.01, from the refractive index of the optical lens having a dioptric function; and/or during the immersion step a transparent wafer having two opposed parallel surfaces is positioned on one or both surfaces of the optical lens having a dioptric function, the gap between the surface of the optical lens and the transparent wafer being filled with a transparent liquid having a refractive index deferring by less than 0.05, for example by less than 0.01, from the refractive index of the optical lens having a dioptric function; and/or the space between the front face of the wafer and the liquid has a constant thickness, and the optical plate has a constant thickness; and/or the transparent wafer is placed as close as possible from the front or rear surface of the optical lens having a dioptric function, for example in contact with at least a point of the front or rear surface of the optical lens having a dioptric function.

According to a further aspect, the invention relates to a method of assembling a head mounted display device adapted for a wearer, the method comprising a relative position adapting step during which the relative position of the display device and the rest of the head mounted device is adapted while measuring an optical performance parameter of the head mounted display device using a method according to the invention, so as to optimize an optical performance parameter of the wearer.

The invention also relates to a method of assembling a head mounted display device adapted for a wearer and configured so that the display images are seen by the wearer though an optical lens having a dioptric function, the method comprising a relative position adapting step during which the relative position of the display device and the rest of the head mounted device, for example the optical lens having a dioptric function, during which the relative position of the display device and the rest of the head mounted device is adapted while having a compensation optical element provided between the optical lens of the head mounted display device and the entrance pupil of an optical measurement device, so as to compensate the dioptric function of the optical lens having a dioptric function.

The invention further relates to an imaging photo-colorimeter having a pupil shift element configured to shift the entrance pupil of the imaging photo-colorimeter.

According to further embodiments which can be considered alone or in combination:

the entrance pupil of the pupil shift element has a diameter greater than or equal to 2 mm and smaller than or equal to 10 mm; and/or the imaging photo-colorimeter comprises an objective configured to have a focus range between 25 cm and infinity; and/or the objective comprises an objective entrance pupil, an objective exit pupil, a first positive lens having a first focal distance and a second positive lens having a second focal distance, the objective entrance pupil, the first and second positive lenses and the exit pupil being placed only a common optical axis, with a distance between the entrance pupil and the first positive lens equal to the focal distance of the first positive lens, a distance between the first positive lens and the second positive lens equal to the addition of the focal distances of the first and second optical lenses, and the distance between the exit pupil and the second positive lens equal to the focal distance of the second positive lens; and/or the optical magnification of the objective is equal to −1.

BRIEF DESCRIPTION OF THE DRAWINGS

Embodiments of the invention will now be described, by way of example only, and with reference to the following drawings in which.

DETAILED DESCRIPTION OF PREFERRED EMBODIMENTS

Elements in the figures are illustrated for simplicity and clarity and have not necessarily been drawn to scale. For example, the dimensions of some of the elements in the figure may be exaggerated relative to other elements to help improve the understanding of the embodiments of the present invention.

The invention relates to a method for determining an optical performance parameter of a head mounted display device adapted for a wearer.

Figure 1:
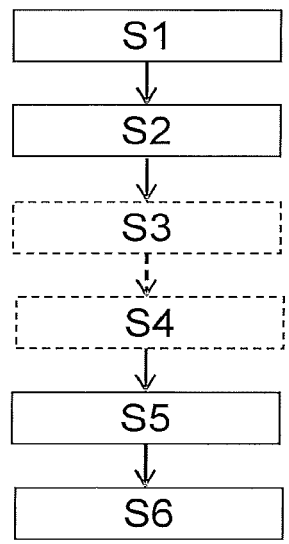
FIG. 1 is a flowchart of a method according to the invention.

As illustrated on FIG. 1, the method of the invention comprises at least:
head mounted display device providing step S1,
an optical measurement device providing step S2,
a positioning step S5, and
an optical performance parameter determining step S6.

A head mounted device adapted for a wearer is provided during the head mounted display device providing step S1.

Figure 2:
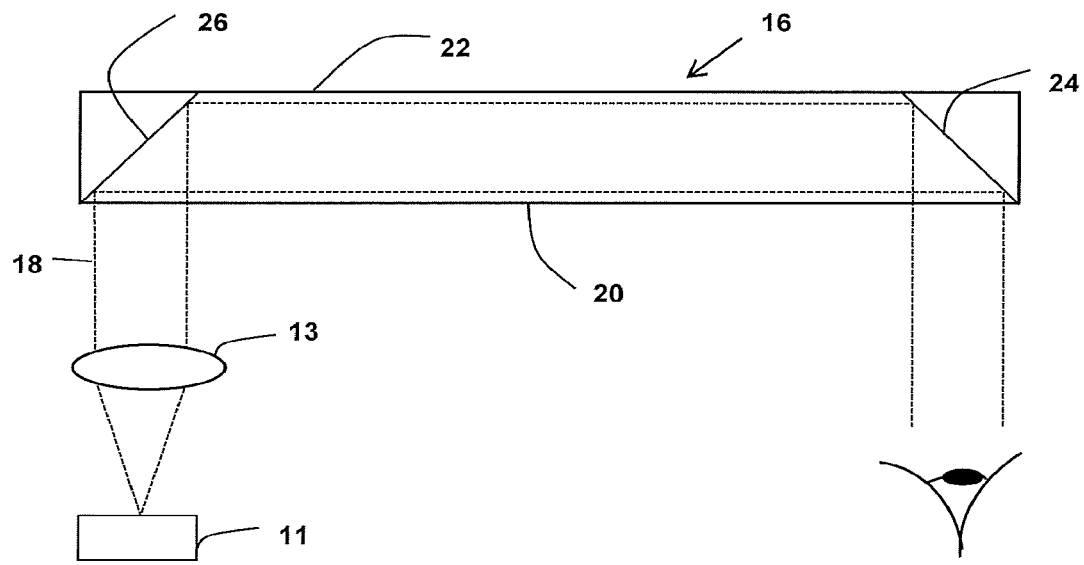
FIG. 2 is a schematic representation of a head mounted display device.

An example of head mounted display device is illustrated on FIG. 2.

A head mounted device may comprise a virtual image display device, preferably allowing the wearer to see both the virtual image and the real world through it.

An example of see-through display system is illustrated in FIG. 2. Such see-trough display system comprises a display source 11, a collimating device 13, and an optical insert 16 constituted by a light-guide optical element 16 (LOE).

The display source 11 can be emissive or not emissive.

The light-guide optical element 16 typically includes at least two major surfaces 20 and 22 and edges, at least one partially reflecting surface 24 and an optical element 26 for coupling light thereinto. The output waves 18 from the collimating device 13 enter the light-guide optical element 16 through its lower surface 20. The incoming waves (towards the light-guide optical element 16) are reflected from the surface 26 and trapped in the light-guide optical element 16.

In an embodiment, the electro-optical system may comprise a plane light-guide optical element 16 with at least two planar major surfaces 20 and 22.

In an alternative embodiment, the electro-optical system may comprise a curved light-guide optical element 16.

The light-guide may be encapsulated in an optical lens, for example inserted laterally in a slot of the optical lens or by stacking in close contact the light-guide with at least one substrate of the optical lens and made integral with an adhesive.

The light-guide may also be placed in front of an optical lens. The head mounted device may be a see-through head mounted display device.

Although not represented on FIG. 2, the head mounted device may be mounted in a spectacle frame.

An optical measurement device is provided during the optical measurement device providing step S2. The optical measurement device comprises at least an entrance pupil Pe and a sensor 28 receiving light through the entrance pupil.

The optical measurement device may be an imaging photo-colorimeter.

Such optical measurement device allows recovering at any pixel in an acquired image a photocolorimetric parameter corresponding to a color sensation. Imaging photo-colorimeter usually comprise an objective adapted to focus over a given range of distances, a sensor and a wheel filter 29 to link acquisitions by the device to colorful sensations perceived by the human eye.

Usually, this type of measuring device, is used for characterizing the quality of screen display such a computer or TV screens. In such cases, the imaging photo-colorimeter is placed in front of the screen. However, the relative position of the imaging photo-colorimeter and the screen has very little importance as long as the screen is in focus, unlike when determining the optical performance of a head mounted device.

Indeed, in the case of a head mounted display determining the optical performance of the display device without knowledge of the position of the wearer's pupil when wearing the display device provides poor accuracy determination.

Therefore, during the positioning step S5, the optical measurement device and the head mounted display device are positioned so that the position of the entrance pupil of the optical measurement device corresponds to the position of the pupil of the wearer when wearing the head mounted display device.

Advantageously, positioning the entrance pupil of the optical measurement device so as to correspond to the position of the pupil of the wearer when wearing the head mounted display device increases the accuracy of the determination of the optical parameters.

During the positioning step the relative position of the entrance pupil of the optical measurement device and the head mounted display device may comprise adapting the position in translation and in rotation.

If the head mounted device comprises an optical lens, the positioning step may comprise the optical lens orientation, for example the pantoscopic or wrap angles relative to the pupil of the eye so as to correspond to a given gazing direction, such as straight ahead.

When determining the optical performance of a head mounted device space may be an issue. In particular when positioning the optical measurement device so as to have the entrance pupil correspond to the position of the pupil of the wearer part of the measuring device may interfere with part of the head mounted device, for example part of the spectacle frame.

Indeed, for some configuration of the head mounted display devices the spectacle frame comprise part of the electronic element required to display an image. Therefore, it may not be possible to remove the spectacle frame, in particular the temple of the spectacle frame.

To overcome such arrangement issue, the method of the invention may comprise prior to the positioning step, a pupil shift element providing step S3.

During the pupil shift element providing step a pupil shift element configured to shift the entrance pupil of the optical measurement device is provided.

During the positioning step the pupil shift element is configured so as to shift the entrance pupil of the optical measurement device to the position of the pupil of the wearer when wearing the head mounted display device.

The shift element may further be configured to allow orienting the entrance pupil of the optical measurement device relative to the display device.

According to an embodiment of the invention, the entrance pupil of the measuring device and/or of the pupil shift element has/have a diameter greater than or equal to 2 mm and smaller than or equal to 10 mm. Advantageously, such diameter being close to the one of the pupil of the wearer, the optical parameter determined using the method of the invention more accurately corresponds to the optical parameter perceived by the wearer.

Furthermore, the measuring device may have a range of accommodation at least equal to that of a standard wearer, for example between 25 cm and infinity allowing to have the measuring device focus of the images displayed by the head mounted display device that is usually displayed at a position between a few meters and infinity.

Figure 3:
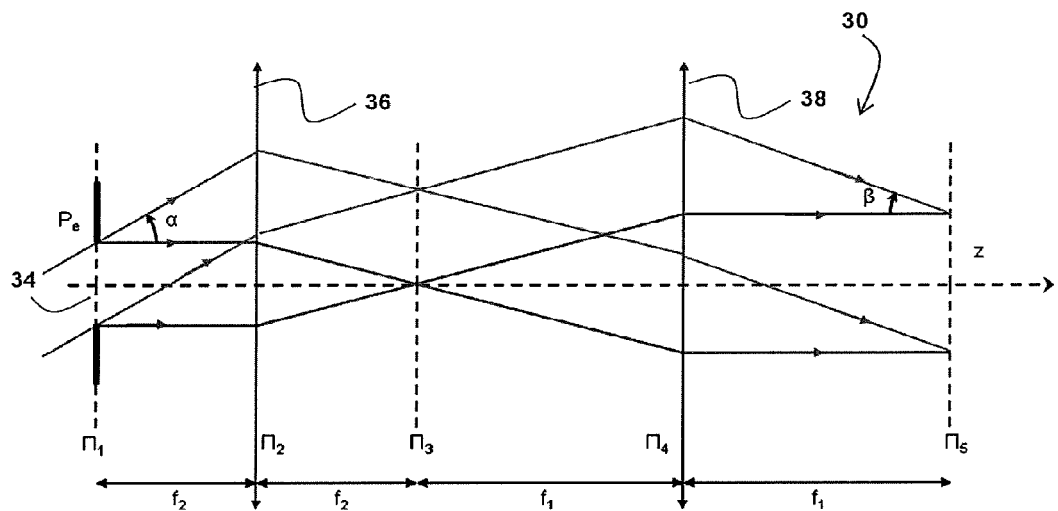
FIG. 3 is a schematic representation of a shift element of the invention.

FIG. 3 represents an example of an objective of a measuring device that may be used to shift the pupil entrance of the measuring device.

The objective 30 comprises an objective entrance pupil not represented in plan ms, an objective exit pupil 34 in plan $\pi_5$, a first positive lens 36 having a first focal distance in plan $\pi_2$ and a second positive lens 38 in plan $\pi_4$, having a second focal distance.

The objective entrance pupil, the first and second positive lenses and the exit pupil are placed along a common optical axis, with a distance between the entrance pupil and the first positive lens equal to the focal distance of the first positive lens, a distance between the first positive lens and the second positive lens equal to the addition of the focal distances of the first and second optical lenses, and the distance between the exit pupil and the second positive lens equal to the focal distance of the second positive lens.

The afocal objective 30 allows moving the entrance pupil upstream of its structure. The afocal objective entrance pupil of the optical measurement device in plan $\pi_5$ is moved upstream to plan $\pi_1$.

An advantage of this type of module is particularly the small diameter of the optical lenses allowing a tubular shape particularly appropriate for measuring head mounted display device mounted in a spectacle frame.

A further advantage of the objective illustrated on FIG. 3 is to allow applying an angular magnification term $\gamma=-f2/f1$ in the field of the scene with f1 and f2 the focal distances of the optical lenses. So if the acquisition system has an angle of view of $\beta$, the same system with the objective illustrated on FIG. 3 has an angle of view $\alpha$ of $\beta/|\gamma|$.

Figure 4:
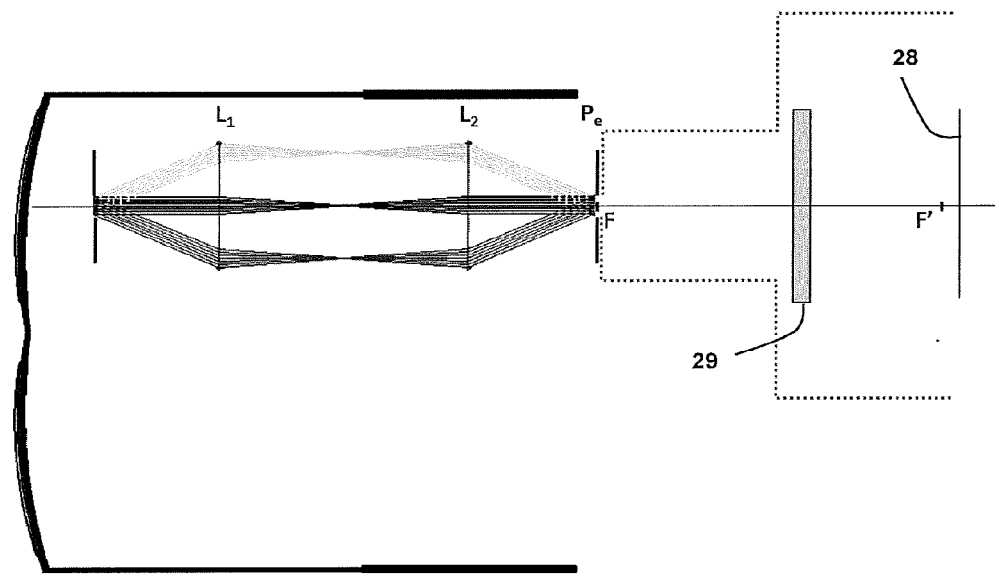
FIG. 4 illustrates a measuring step of a method of the invention.

FIG. 4 illustrates an example of measuring device provided with a shift element whose exit pupil is shifted about 20 cm upstream Pe.

In this case $\gamma=-1$. The block has a diameter of about 30 mm, which allows our characterizations on most type of head mounted display devices.

The shift element may be afocal or pseudo afocal, and optionally contain one or more mirrors. The set of optical lenses can have one or more aspherical surfaces so as to maximize the optical performance of the overall element. The shift element is preferably at least 15 cm long so as to be longer than most spectacle frame temple.

At least one optical performance parameter of the head mounted see-through display device is determined based on the data measured by the optical measurement device during the optical performance determining step S6.

According to an embodiment of the invention, the head mounted display device may be configured so that the display images are seen by the wearer through an optical lens having a dioptric function.

In the sense of the invention an optical lens having a dioptric function is to be understood as having a deviation effect on the light beams coming from the display.

In some specific configurations the optical lens having a dioptric function may not be removed from the head mounted device when implementing the method of the invention. The dioptric function may make it very difficult or even impossible to measure accurately the optical performance parameter. In particular it may make it difficult for the measuring device to correctly focus on the displayed image, in particular if the dioptric function comprises astigmatism.

Therefore, as illustrated on FIG. 1, the method of the invention may further comprise prior to the positioning step a compensation optical element providing step S4.

During the compensation optical element providing step S4 an optical element having a dioptric function adapted to compensate the dioptric function of the optical lens having a dioptric function is provided between the optical lens having a dioptric function and the entrance pupil of the entrance pupil of the optical measurement device.

Advantageously the effect of the dioptric function of the optical lens of the head mounted display device may be compensated and from the point of view of the optical measurement device the displayed image is seen as if the optical lens has no dioptric function.

The optical element adapted to compensate the dioptric function may comprise a set of optical lenses provided between the display device and the pupil of the optical measurement device.

The optical element adapted to compensate the dioptric function may comprises an optical lens provided on the pupil of the optical measurement device.

An active optical lens may further be used to compensate the dioptric function, for example a liquid-crystal electronically driven lenses, or fluid-filled or Alvarez lenses.

The method of the invention may further comprise prior to the positioning step an immersion step S4.

During the immersion step, the optical element having a dioptric function is immerged in a medium having a refractive index deferring by less than 0.05, for example less than 0.01, from the refractive index of the optical lens having a dioptric function.

For example, during the immersion step a transparent wafer having two opposed parallel surfaces is positioned on one or both surfaces of the optical lens having a dioptric function.

In the sense of the invention parallel means having parallel tangent at each point of the surface.

The gap between the surface of the optical lens and the transparent wafer being filled with a transparent liquid having a refractive index deferring by less than 0.05, for example by less than 0.01, from the refractive index of the optical lens having a dioptric function.

Preferably, the transparent wafer is placed as close as possible from the front or rear surface of the optical lens having a dioptric function, for example in contact with at least a point of the front or rear surface of the optical lens having a dioptric function.

Figure 5:
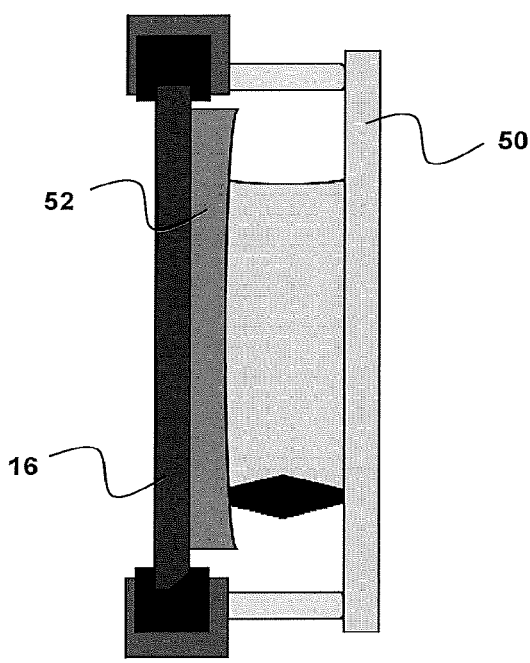
FIG. 5 illustrates an immersion step of a method of the invention.

FIG. 5 illustrates an example of an embodiment of the invention where an immersion device is used to compensate the dioptric function.

As shown bi-plane transparent mineral plat 50, preferably with anti-reflection coating in the visible spectrum, is mounted parallel to the surfaces of the optical insert 16 adapted for displaying the virtual image.

The mineral plat 50 allows compress a seal against the optical lens 52 having a dioptric function.

The sealed tank between the mineral plat 50 and the optical lens 52 is filled with liquid having a refractive index deferring by less than 0.05, for example by less than 0.01, from the refractive index of the optical lens having a dioptric function.

Advantageously this will remove the optical interface between the optical lens having the dioptric function and the air and temporarily compensate for the dioptric function.

Having the mineral plat 50 parallel to the surfaces of the optical insert 16 surface prevents the appearance of prism during the measurement. The parallelism may be ensured by placing the mineral plat 50 directly on the display device or via intermediate pieces.

If the surface of the optical insert has a none flat shape, the device would need to be adapted so that both surfaces of the mineral plate have exactly the same non-planar shape. The requirement is that firstly the space between the front face of the wafer, that is the rear surface 20 of the light-guide optical element 16 if not considering the adhesive thickness and the liquid has a constant thickness, and secondly the optical plate has a constant thickness.

The invention may further refer to a method of assembling a head mounted display device adapted for a wearer. Such method may comprise a relative position adapting step during which the relative position of the display device and the rest of the head mounted device is adapted while measuring an optical performance parameter of the head mounted display device using a method according to the invention, so as to optimize an optical performance parameter of the wearer.

Among the optical performance parameter that may be measured one can consider:
- the uniformity of color in the image field: one can for example verify the chromaticity coordinates of a given color remain constant throughout the field, and/or
- the lack of image duplication, particularly when using a waveguide type Lumus when the output image is not perfectly collimated, and/or
- the distortion of the image, which can be observed via the deformation of a grid.

The invention may further relate to a method of assembling a head mounted display device adapted for a wearer and configured so that the display images are seen by the wearer though an optical lens having a dioptric function.

Such method may comprise a relative position adapting step during which the relative position of the display device and the rest of the head mounted device, for example the optical lens having a dioptric function, is adapted while having a compensation optical element provided between the optical lens of the head mounted display device and the entrance pupil of an optical measurement device, so as to compensate the dioptric function of the optical lens having a dioptric function.

The invention has been described above with the aid of embodiments without limitation of the general inventive concept; in particular the mounted sensing device is not limited to a head mounted device.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method for determining an optical performance parameter of a head mounted display device adapted for a wearer, the method comprising:
   providing a head mounted display device adapted for a wearer;
   providing an optical measurement device, the optical measurement device comprises at least an entrance pupil and a sensor receiving light through the entrance pupil;
   providing a pupil shift element configured to shift the entrance pupil of the optical measurement device;
   positioning the optical measurement device and the head mounted display device so that a position of the entrance pupil of the optical measurement device corresponds to a position of a pupil of the wearer when wearing the head mounted display device, and shifting using the pupil shift element, the entrance pupil of the optical measurement device to the position of the pupil of the wearer when wearing the head mounted display device; and
   determining at least one optical performance parameter of the head mounted see-through display device based on data measured by the optical measurement device.

2. The method according to claim 1, wherein the entrance pupil of the measuring device and/or of the pupil shift element has/have a diameter greater than or equal to 2 mm and smaller than or equal to 10 mm.

3. The method according to claim 1, wherein the pupil shift element comprises an objective configured to have a focus range between 25 cm and infinity.

4. The method according to claim 3, wherein the objective comprises an objective entrance pupil, an objective exit pupil, a first positive lens having a first focal distance and a second positive lens having a second focal distance, the objective entrance pupil, the first and second positive lenses and the exit pupil being placed along a common optical axis, with a distance between the entrance pupil and the first positive lens equal to the focal distance of the first positive lens, a distance between the first positive lens and the second positive lens equal to the addition of the focal distances of the first and second optical lenses, and the distance between the exit pupil and the second positive lens equal to the focal distance of the second positive lens.

5. The method according to claim 3, wherein an optical magnification of the objective is equal to −1.

6. The method according to claim 1, wherein the optical measurement device is an imaging photo-colorimeter.

7. The method according to claim 1, wherein the head mounted display device is mounted in a spectacle frame.

8. The method according to claim 1, wherein the head mounted display device is a see-through head mounted display device.

9. The method according to claim 1, wherein the head mounted display device is configured so that the display images are seen by the wearer through an optical lens having a dioptric function,
   and the method further comprises prior to the positioning providing an optical element having a dioptric function adapted to compensate the dioptric function of the optical lens having a dioptric function between the optical lens having a dioptric function and the entrance pupil of the entrance pupil of the optical measurement device.

10. The method according to claim 1, wherein the head mounted display device is configured so that the display images are seen by the wearer through an optical lens having a dioptric function,
   and the method further comprises prior to the positioning immerging the optical element having a dioptric function in a medium having a refractive index deferring by less than 0.05 from the refractive index of the optical lens having a dioptric function.

11. The method according to claim 10, wherein during the immerging a transparent water having two opposed parallel surfaces is positioned on one or both surfaces of the optical lens having a dioptric function, a gap between the surface of the optical lens and the transparent wafer being filled with a transparent liquid having a refractive index deferring by less than 0.05 from the refractive index of the optical lens having a dioptric function.

12. The method according to claim 11, wherein the transparent wafer is placed as close as possible from the front or rear surface of the optical lens having a dioptric function.

13. A method of assembling a head mounted display device adapted for a wearer, the method comprising:
   adapting a relative position of the display device and the rest of the head mounted device while measuring an optical performance parameter of the head mounted display device by the method according to claim 1, so as to optimize an optical performance parameter of the wearer.

14. A method of assembling a head mounted display device adapted for a wearer and configured so that the display images are seen by the wearer though an optical lens having a dioptric function, the method comprising:
   adapting a relative position of the display device and the rest of the head mounted device during which the relative position of the display device and the rest of the head mounted device is adapted while having a compensation optical element provided between the optical lens of the head mounted display device and the entrance pupil of an optical measurement device, so as to compensate the dioptric function of the optical lens having a dioptric function.

15. The method according to claim 1, wherein the head mounted display device is configured so that the display images are seen by the wearer through an optical lens having a dioptric function,
   and the method further comprises prior to the positioning immerging the optical element having a dioptric function in a medium having a refractive index deterring by less than 0.01 from the refractive index of the optical lens having a dioptric function.

16. The method according to claim 15, wherein during the immerging a transparent wafer having two opposed parallel surfaces is positioned on one or both surfaces of the optical lens having a dioptric function, a gap between the surface of the optical lens and the transparent wafer being filled with a transparent liquid having a refract re index deferring by less than 0.01 from the refractive index of the optical lens having a dioptric function.

17. The method according to claim 16, wherein the transparent wafer is placed in contact with at least a point of the front or rear surface of the optical lens having a dioptric function.

18. The method according to claim 14, wherein the rest of the head mounted device includes the optical lens having a dioptric function.

* * * * *